United States Patent [19]

Barsotti et al.

[11] Patent Number: 4,906,677

[45] Date of Patent: Mar. 6, 1990

[54] MULTI-COMPONENT COATING COMPOSITION COMPRISING AN ANHYDRIDE CONTAINING POLYMER, A GLYCIDYL COMPONENT AND A PHOSPHONIUM CATALYST

[75] Inventors: Robert Barsotti, Franklinville, N.J.; Lester S. Cohen, Broomall, Pa.

[73] Assignee: E. I. Du Pont de Nemours & Company, Wilmington, Del.

[21] Appl. No.: 212,298

[22] Filed: Jun. 27, 1988

[51] Int. Cl.$^4$ .................... C08K 5/01; C08K 5/10; C08L 63/02
[52] U.S. Cl. .................... 523/400; 523/437; 523/439; 525/74; 525/108; 525/113; 525/116; 525/117; 525/118; 525/119; 525/207; 525/208; 525/221; 525/94
[58] Field of Search .................... 523/400, 437, 439; 525/74, 108, 113, 116, 117, 118, 119, 207, 208, 221

[56] References Cited

U.S. PATENT DOCUMENTS

| | | | |
|---|---|---|---|
| 3,136,736 | 6/1964 | Washburne et al. | 525/119 |
| 3,591,533 | 5/1971 | Antonelli et al. | 428/520 |
| 4,452,948 | 6/1984 | Marrion et al. | 525/207 |
| 4,507,411 | 3/1985 | Gordon et al. | 523/436 |
| 4,732,791 | 3/1988 | Blackburn et al. | 427/407 |
| 4,816,500 | 3/1989 | Corcoran | 523/437 |

FOREIGN PATENT DOCUMENTS 0123793 1/1984 European Pat. Off.
994881 6/1965 United Kingdom.

*Primary Examiner*—John Kight
*Assistant Examiner*—Frederick Krass
*Attorney, Agent, or Firm*—John M. Lynn

[57] ABSTRACT

A coating composition useful for a finish for automobiles and trucks in which the film forming binder contains reactive binder components of about (a) 25-90% by weight, based on the weight of the binder, of an acrylic polymer having at least two reactive anhydride groups composed of polymerized monomers of an ethylenically unsaturated anhydride and polymerized monomers from the group consisting of alkyl methacrylate, alkyl acrylate and any mixtures thereof, wherein the alkyl groups have 1-8 carbon atoms and the polymer has a weight average molecular weight of about 2,000-50,000;

(b) 5-50% by weight, based on the weight of the binder, of a glycidyl component having at least two reactive glycidyl groups; and (c) 0.1-7% by weight, based on the weight of the binder, of a phosphonium catalyst or a blend of a phosphonium catalyst and a tertiary amine catalyst which may or may not contain hydroxyl groups.

15 Claims, No Drawings

MULTI-COMPONENT COATING COMPOSITION COMPRISING AN ANHYDRIDE CONTAINING POLYMER, A GLYCIDYL COMPONENT AND A PHOSPHONIUM CATALYST

This invention is related to a multi-component coating composition.

There are a wide variety of multi-component coating compositions available for finishing substrates. Typically with these compositions, the components are mixed together before application and then the resulting composition is applied by conventional techniques such as spraying and the composition is cured at ambient temperatures or can be cured at elevated temperatures. These compositions are used to finish original equipment, automobiles and trucks, refinish automobiles and trucks, paint structures such as bridges and buildings, paint appliances, metal cabinets and the like.

Representative of such compositions are shown in the following patents:

Gorden et al. U.S. Pat. No. 4,507,411, issued Mar. 26, 1985 shows a two component composition of a functionalized polymeric component and glycidyl component that in the presence of an amine, alcohol, ketimine, acetal or oxazolidine cures at ambient temperatures. However, the compositions disclosed are not useful for finishes for automobiles and trucks.

European Patent Application 0,123,793 shows a two component composition in which one component has an anhydride ring that is opened with an amine and has a second component that contains glycidyl groups. Finishes formed from such compositions are not useful for automobiles and trucks since the finishes whiten and blister on exposure to high humidity conditions and exhibit recoat lifting when repaired within several days after the finish has been applied.

British patent 994,881 assigned to Rohm & Haas discloses coating compositions comprising polyepoxides, maleic anhydride and the catalyst is a quaternary ammonium salt of fluoroboric acid or an amine. Out inventive coating composition does not use quaternary ammonium salts of fluoroboric acid. Our inventive coating composition used phosphonium catalysts which impart excellent environmental chemical resistance.

U.S. Pat. No. 3,136,736 issued June 9, 1964, to Wyncote et al and assigned to Rohm & Haas discloses a coating composition comprising polyepoxides, maleic anhydrides and uses amines or quaternary ammonium salts as catalysts. The disclosure does not teach or suggest the use of phosphonium salts as a catalyst in order to achieve marked improvement in chemical resistance to strong acids and strong bases. Such a composition is necessary to produce environmentally resistant coatings in today's atmospheric conditions (e.g., acid rain). In addition, the disclosed composition has a much higher organic solvent content, higher molecular weight resins and a lower level of anhydride in the resin.

U.S. Pat. No. 4,732,791 issued Mar. 22, 1988, to Blackburn et al concerns a coating composition comprising polyepoxides, a monomeric anhydride curing agent, a low number average molecular weight hydroxyl group containing polyfunctional function material and amine or opium salts. However, the composition disclosed contains monomeric anhydrides rather than polymeric anhydries and contains hydroxyl group containing polyfunctional material which is not necessary in our composition.

There is a need for a coating composition that provides a high quality finish that is useful on an exterior finish for automobiles and trucks that has excellent adhesion to the substrate to which it is applied, good outdoor weatherability, humidity resistance, excellent appearance and excellent environmental chemical resistance.

Furthermore, because of environmental concerns about volatile organic components (VOC's) there is a need for such a coating composition with a high solids content which retains its sprayability. Many previous multi-component coating compositions have had to have a solids content of less than 35 percent to ensure sprayability. There is a need for a sprayable coating composition with a solids content of greater than 55 percent which retains an excellent mix of other desirable coating composition qualities such as pot life, hardness, durability, humidity resistance and chemical resistance.

SUMMARY OF THE INVENTION

A coating composition containing 20-80% by weight of reactive binder components and 80-20% by weight of an organic carrier: the binder contains (a) an anhydride acrylic polymer having at least two anhydride groups and having a weight average molecular weight of about 2,000-50,000;

(b) a component having at least two reactive glycidyl groups;

(c) a phosphonium catalyst or a blend of a phosphonium catalyst and a tertiary amine catalyst which may or may not contain hydroxyl groups.

DETAILED DESCRIPTION OF THE INVENTION

The film forming binder of the coating composition of this invention contains components that are mixed together before application. The film forming binder content of the composition is about 20-80% by weight of an organic carrier which usually is a solvent for the binder.

The composition forms an excellent clear coating over colored pigmented finishes. The coating has good adhesion to the pigmented finish, has excellent humidity resistance, excellent environmental chemical resistance, and is weatherable and durable. The composition is useful for finishing the exterior of automobiles and trucks and the composition can be pigmented to form a colored finish. Also, the composition can be used over plastic substrates used in automobiled and trucks such as filler panels, side panels, fender extensions, moldings and other trim parts.

The composition also can be pigmented to form a colored finish. These pigmented compositions are useful as exterior original equipment coatings for automobiles and trucks and as industrial coatings for appliances, metal cabinets, shelves and the like.

Preferably, the coating composition has a high solids content and contains about 40-80% by weight binder and 20-60% by weight of organic solvent. The binder of the composition contains about 25-90% by weight of anhydride acrylic polymer containing at least two anhydride groups, 5-50% by weight of a glycidyl containing component and 0.1-7% by weight of a catalyst which is phosphonium or a blend of phosphonium and tertiary amine which may or may not contain hydroxyl groups.

The anhydride acrylic polymer has a weight average molecular weight of about 2,000-50,000 determined by gel permeation chromatography using polymethyl methacrylate as a standard and preferably, has a weight average molecular weight of 3,000-25,000.

The anhydride acrylic polymer is prepared by conventional techniques in which the monomers, solvent, and conventional catalysts such as t-butyl perbenzoate are charged into a polymerization vessel and heated to about 75°-200° C. for about 0.5-6 hours to form the polymer.

The anhydride acrylic polymer is formed by polymerizing monomers of alkyl methacrylates, or alkyl acrylates or mixtures thereof, where the alkyl groups have 1-12 carton atoms and ethylenically unsaturated anhydrides (or ethylenically unsaturated dicarboxylic acids which are converted to the acid anhydride during the polymerization). Optionally, the anhydride acrylic polymer can contain other components such as styrene, α-methyl styrene, acrylonitrile, methacrylonitrile in amounts of about 0.1-50% by weight.

Typical alkyl acrylates and methacrylates that can be used to form the anhydride acrylic polymer are as follows: methyl methacrylate, ethyl methacrylate, propyl methacrylate, butyl methacrylate, pentyl methacrylate, hexyl methacrylate, octyl methacrylate decyl methacrylate, lauryl methacrylate, methyl acrylate, ethyl acrylate, propyl acrylate, butyl acrylate, octyl acrylate, nonyl acrylate, decyl acrylate, lauryl acrylate and the like. Other components that can be used to form the anhydride acrylic polymer are acrylamide, methacrylamide, acrylo alkoxy silanes such as gamma methacryloyl propyl trimethoxy silane. Also the anhydride acrylic polymer can contain about 0.1-5% by weight of an ethylenically unsaturated acid such as acrylic acid, methacrylic acid, itaconic acid, maleic acid and the like.

Typically useful ethylenically unsaturated anhydrides are as follows: itaconic anhydride, maleic anhydride, isobutenyl succinic anhydride and the like. It is also possible to impart the anhydride functionality to the anhydride acrylic polymer by using the appropriate ethylenically unsaturated dicarboxylic acid which converts to the corresponding acid anhydride by simple heating. Ethylenically unsaturated dicarboxylic acids that can be used are itaconic acid, maleic acid, isobutenyl succinic acid and the like.

Preferred anhydride acrylic polymers are as follows: styrene/butyl methacrylate/butyl acrylate/ itaconic anhydride, methyl methacrylate/butyl acrylate/itaconic anhydride, butyl acrylate/styrene/maleic anhydride/maleic acid, methyl methacrylate/butyl acrylate/itaconic anhydride.

The glycidyl component contains at least two glycidyl groups and can be an oligomer or a polymer. Typical glycidyl components are as follows: sorbitol polyglycidyl ether, mannitol polyglycidyl ether, pentaerythritol polyglycidol ether, glycerol polyglycidyl ether, low molecular weight epoxy resins such as epoxy resins of epichlorohydrin and bisphenol A., di- and polyglycidyl esters of acids, polyglycidyl ethers of isocyanurates, such as "Denecol" EX301 from Nagase. Sorbitol polyglycidyl ether, such as Araldite XYGY-358 ® from Ciba-Geigy, and di- and polyglycidyl esters of acids, such as Araldite CY-184 ® from Ciba-Geigy, are preferred since they form high quality finishes.

Glycidyl methacrylate or acrylate containing acrylic polymers can be used such as random and block polymers of glycidyl methacrylate/butyl methacrylate. The block polymers can be prepared by anionic polymerization or by group transfer polymerization.

The composition contains about 0.1-7% by weight of the binder of a catalyst which is a phosphonium catalyst or a blend of a phosphonium catalyst and a tertiary amine which may or may not contain hydroxyl groups. The phosphonium catalyst imparts substantially superior chemical resistance to the anhydride/epoxy coating compositions of our invention when compared to other known catalysts. It is surprisingly resistant to chemicals such as sulfuric acid, formic acid, sodium hydroxide and salts such as calcium sulfate. Examples of the phosphonium catalysts are benzyl triphenyl phosphonium chloride; ethyl triphenyl phosphonium bromide; tetra butyl phosphonium chloride; tetra butyl phosphonium bromide; benzyl triphenyl phosphonium iodide; benzyl triphenyl phosphonium bromide; ethyl triphenyl phosphonium iodide and the like.

The composition may also contain a blend of tertiary amine catalysts along with the phosphonium catalyst. The tertiary amine is added to give enhanced rheology control. Examples of the tertiary amine catalysts are as follows: triethylene diamine, quinuclidine, dialkyl alkanol amines such as dimethyl ethanolamine, diethyl ethanol amine, dibutyl ethanol amine, diethyl hexanol amine and the like, lithium tertiary butoxide, tri(dimethylaminomethyl)phenol, bis(dimethylamino)propan-2-ol, N,N,N¹, N¹-tetramethylethylenediamine, N,methyldiethanolamine, N,N-dimethyl-1,3-propanediamine and 1-dimethylamino-2-propanol and multi-hydroxyl amines such as methyl diethanol amine and triethanol amine.

Typical solvents used to prepare the anhydride acrylic polymer and used as a diluent for the coating composition are as follows: toluene, xylene, butyl acetate, ethyl benzene, higher boiling aromatic hydrocarbons, amyl acetate, ethyl acetate, propyl acetate, ethylene or propylene glycol mono alkyl ether acetates.

In addition to the solvents listed above certain alcoholic solvents are also useful. The alcoholic solvents under certain use conditions convert portions of the anhydride to a half ester also useful as reactants in this system. Examples of such alcohols are propanol, isobutanol, methanol, isopropanol tertiary butanol, n-butanol, propylene glycol monoethyl ether, ethylene glycol mono butyl ether, and other alcoholic solvents.

The coating composition may also contain components such as monomeric anhydrides; acid functional monomeric, oligomeric or polymeric components which may or may not contain hydroxyl functionality; hydroxy functional polymers; and self-stabilized dispersed resins. Examples of monomeric anhydrides are methyl hexahydrophthalic anhydride, hexahydrophthalic anhydride, succinic anhydride and the like. Examples of such acid functional components are glycolic acid and acrylate/methacrylic acid copolymer and the like. Examples of hydroxyl functional polymers are polymers such as acrylic polyols, polyester polyols, polyether polyols, polyesterurethane polyols and acrylourethane polyols.

Generally, the composition is applied by conventional techniques such as spraying and electrostatic spraying. The resulting coating can be dried and cured at elevated temperatures of 60° to 200° C. Coatings are applied to form a finish about 0.5-5 mils thick, and preferably 1-2 mils thick. The finish has excellent gloss, good adhesion to substrate, excellent weatherability, high solids, and excellent environmental chemical resistance.

To improve weatherability of the clear finish of the coating composition, about 0.1–5%, by weight, based on the weight of the binder, of an ultraviolet light stabilizer or a combination of ultraviolet light stabilizers can be added. These stabilizers include ultraviolet light absorbers, screeners, quenchers and specific hindered amine light stabilizers. Also, about 0.1–5% by weight, based on the weight of the binder, of an antioxidant can be added.

Typical ultraviolet light stabilizers that are useful are as follows:

Benzophenones such as hydroxydodecyclobenzophenone, pheonone, 2,4-dihydroxybenzophenone, hydroxy-benzophenones containing sulfonic acid groups, 2,4-dihydroxy-3',5'-di-t-butylbenzophenone, 2,2',4'-trihydroxybenzophenone esters of dicarboxylic acids, 2-hydroxy-4-acryloxyethoxybenzophenone, aliphatic mono-esters of 2,2',4-trihydroxy-4'-alkoxybenzophenone, 2-hydroxy-4-methoxy-2'-carboxybenzophenone;

Triazoles such as 2-phenyl-4-(2'-4'-dihydroxybenzoyl)triazoles, substituted benzotriazoles such as hydroxyphenyltriazoles such as 2-(2'hydroxy-5'-methylphenyl) benzotriazole, 2-(2'hydroxyphenyl)benzotriazole, 2-(2'-hydroxy-5'-octylphenyl)naphthotriazole;

Triazines such as 3,5-dialkyl-4-hydroxyphenyl derivatives of triazine, sulfur-containing derivatives of dialkyl-4-hydroxyphenyltriazines, hydroxyphenyl-1,3,5-triazines and such triazines containing sulfonic acid groups, aryl-1,3,5-triazines, orthohydroxyaryl-s-triazine;

Benzoates such as dibenzoate of diphenylolpropane, t-butyl benzoate of diphenylolpropane, nonyl phenyl benzoate, octyl phenyl benzoate, resorcinol dibenzoate.

Other ultraviolet light stabilizers that can be used include lower alkyl thiomethylene-containing phenols, substituted benzenes such as 1,3-bis(2'-hydroxybenzoyl)benzene, metal derivatives of 3,5,-di-t-butyl-4-hydroxyphenylpropionic acid, asymmetrical oxalic acid diarylamides, alkylhydroxyphenylthioalkanoic acid esters, dialkylhydroxyphenylalkanoic acid esters of di- and tri-pentaerythritol, phenyl- and naphthlenesubstituted oxalic acid diamides, methyl-β-(3,5-di-t-butyl-4-hydroxyphenyl)propionate, α,α'-bis(2-hydroxyphenyl)diisopropylbenzene, 3,5'-dibromo-2'-hydroxyacetophenone, ester derivatives of 4,4-bis(4'-hydroxyphenyl)pentaonic acid wherein there is at least one unsubstituted position ortho to the aromatic hydroxyl groups, organophosphorus sulfides such as bis(diphenyl-phosphinothioyl)monosulfide and bis(diphenylphosphinothioyl)disulfide, 4-benzoyl-6-(dialkylhydroxybenzyl)resorcinol, bis(3-hydroxy-4-benzoylphenoxy)-diphenylsilane, bis(3-hydroxy-4-benzoylphenoxy)dialkylsilane, 1,8-naphthalimides, α-cyano-β,β-diphenylacrylic acid derivatives, bis(2-benzoxazolyl)alkanes, bis(2-napthoxazolyl)alkanes, methylene malonitriles containing aryl and heteroacyclic substitutes, alkylenebis(dithio)carbamate, 4-benzoyl-3-hydroxyphenoxyethyl acrylate, 4-benzoyl-3-hydroxyphenoxyethyl methacrylate, aryl or alkyl-substituted acrylonitriles, 3-methyl-5-isopropylphenyl-6-hydroxycourmarone, 8-acetyl-3-dodecyl-7,7,9,9-tetramethyl-1,3,8-triazasprio(4,5)decanol-2,4-dione.

Particularly useful ultraviolet light stabilizers that can be used are hindered amines of piperidyl derivatives such as those disclosed in Murayama et al., U.S. Pat. No. 4,061,616, issued Dec. 6, 1977, column 2, line 65, through column 4, line 2, and nickel compounds such as [1-phenyl-3-methyl-4-decanoylopyrazolate(5)]-Ni, bis[-phenyldithiocarbamato]-Ni(II), and others listed in the above patent, column 8, line 44 through line 55.

The following blend of ultraviolet light stabilizers can be used: 2-[2'-hydroxy-3',5'-1(1-1-dimethyl-propyl)-phenyl]-benzotrizole and bis-[4-(1,2,2,6,6-pentamethyl-piperidyl)] 2-butyl-2-[(3,5-t-butyl-4-hydroxyphenyl)-methyl] propanedioate. The stabilizers can be sued in any ratio however, a 1:1 ratio of benzotriazole to propanedioate is preferred.

Another useful blend of ultraviolet light stabilizers is 2-(benzotriazole-2-VL)-4,6-bis(methylethyl-1-phenyl ethyl)phenol, and 2(3 hydroxy-3,5'-ditert amyl phenyl) benzotriazole.

Generally, when the coating composition of this invention is used as a clear coating, it is applied by conventional spraying techniques, to a color or base coat of an automobile or truck, preferably, electrostatic spraying is used. The coatings are baked at about 60° to 140° C. for about 10 to 40 minutes. The resulting clear coat or finish is about 1–5 mils thick, preferably 1–2 mils thick, and has excellent gloss, good adhesion to the color coat and excellent weatherability and excellent environmental chemical resistance.

The composition can be pigmented to form a colored finish or primer. About 0.1–200% by weight, based on the weight of the binder, of conventional pigments can be added using conventional techniques in which a mill base containing pigment, dispersant and solvent is first formed. The mill base is then mixed with the composition to form a colored composition. This composition can be applied and cured as shown above.

The following examples illustrate the invention. All parts and percentages are on a weight basis unless indicated otherwise. Molecular weights are determined by gel permeation chromatography using polymethyl methacrylate as the standard.

EXAMPLE 1

Anhydride Acrylic Polymer

Styrene/butyl methacrylate/butyl acrylate/itaconic acid(anhydride) copolymer was prepared as follows:

A reactant was loaded with 696.7 parts of xylene and 58.1 parts butyl acetate and heated to reflux temperature under nitrogen. The reactor was fitted with a variable takeoff distillation head to facilitate removal of distillate or reflux as needed.

Then a mixture of the following was added at a uniform linear rate over three hours while maintaining reflux.

| | |
|---|---|
| Styrene monomer | 276.1 parts |
| Butyl methacrylate monomer | 844.0 parts |
| Xylene | 28.8 parts |
| Concurrently the following solid monomer was added in uniform shots every five minutes | |
| Itaconic acid | 481.0 parts |
| Also concurrently, but for a period of 200 minutes, the following initiator solution was added at a uniform linear rate | |
| Tertiary butyl peroxyacetate | 76.8 parts |
| PM acetate | 30.5 parts |
| Xylene | 19.3 parts |
| Total | 1756.5 parts |

During the polymerization, water is formed by dehydration of the polymerized itaconic acid so the anhydride is formed. This water is continuously removed by the water separator distillation apparatus until a total of 63.3 parts of water is separated from the distillate.

This polymer solution had a Gardner-Holdt viscosity of Z1+½ and a measured solids of 69.7%. The anhydride content was determined to be 0.91. Meq/gm and the acid content to be 0.19 Meq/gm. The molecular weight was measured by gel permeation chromatography to be Mn=2074 and Mw=5093.

Acid Polymer

A butyl acrylate/ methacrylic acid copolymer was prepared as follows:

| | |
|---|---|
| Propyleneglycol monomethylether-acetate (PM acetate) | 1604.0 parts |
| Butyl acetate | 441.0 parts |
| Xylene | 1243.0 parts |
| This mixture was heated with agitation under nitrogen to reflux. Then the following mixture was added at a uniform, linear rate over three hours while maintaining reflux. | |
| Butyl acrylate monomer | 2427.0 parts |
| Methacrylic acid monomer | 1630.0 parts |
| Tertiary butyl peroxyacetate | 224.0 parts |
| Then the followng mixture was added over ten minutes while maintaining reflux temperature | |
| Xylene | 200.0 parts |
| Tertiary butyl peroxyacetate | 19.0 parts |
| The reaction mixture was maintained for one hour at reflux temperature and then diluted with the following | |
| PM Acetate | 692.0 parts |
| Total | 8480.0 parts |

This polymer had a Gardner-Holdt viscosity of Z1+½ and a measured solids of 52.3%. The acid content was determined to be 2.28 Meq/gm and molecular weight by gel permeation chromatography was Mn=2762, Mw=6108.

A coating composition using a phosphonium catalyst was prepared by thoroughly blending the following constituents:

| | Parts by Weight |
|---|---|
| Anhydride acrylic polymer (as prepared above) | 435.2 |
| PM acetate | 38.2 |
| Methyl Hexahydrophthalic anhydride | 57.5 |
| Resiflow S ® (acrylic flow additive) | 3.4 |
| Butyl acetate | 118.7 |
| Araldite CY-184 ® (Epoxy resin from Ciba-Geigy) | 238.1 |
| Acid polymer (as prepared above) | 174.3 |
| Butanol | 38.8 |
| Tinuvin 292 ® (Ciba-Geigy hindered amine light stabilizer) | 13.2 |
| Tinuvin 1130 ® (Ciba-Geigy UV screener) | 20.1 |
| 25% Benzyl triphenyl phosphonium chloride in propanol | 66.9 |
| Total | 1204.4 |

The resulting coating composition was reduced to a spray viscosity of 35 seconds measured with a No. 2 Zahn cup accomplished by adding butyl acetate.

The coating composition was sprayed onto a primed metal panel coated with a waterborne basecoat and cured at 180°–200° F. and provided a clear coat with excellent color durability, humidity resistance, chemical resistance, and other film properties. The coating composition was also sprayed over solvent borne melamine cured basecoat and cured at 240°–285° F. The durability, humidity resistance, chemical resistance, and other film properties.

A second coating composition (identical to the one above, except that amine catalysts were used rather than the phosphonium catalyst) was prepared by thoroughly mixing together the following components:

| | Parts by Weight |
|---|---|
| Acrylic polymer (as prepared above) | 435.2 |
| PM acetate | 38.2 |
| Acetic acid | 11.0 |
| Methyl hexahydrophthalic anhydride | 57.5 |
| Resiflow s ® (acrylic flow additive) | 3.4 |
| Butyl acetate | 118.7 |
| Araldite CY-184 ® | 238.1 |
| Acid polymer (as prepared above) | 174.3 |
| Butanol | 38.8 |
| Tinuvin 292 ® | 13.2 |
| Tinuvin 1130 ® | 20.1 |
| 15% bis 2-dimethyl amino ethyl ether in propanol | 22.9 |
| 20% methyl diethanol amine in propanol | 105.2 |
| Total | 1273.6 |

The resulting coating composition was reduced to a spray viscosity of 35 seconds measured with a No. 2 Zahn cup accomplished by adding butyl acetate.

The coating composition was sprayed onto a primed metal panel coated with a waterborne basecoat and cured at 180°–200° F. and provided a clear coat with excellent color durability, humidity resistance, and other film properties. The coating composition was also sprayed over solvent borne melamine cured basecoat and cured at 240°–285° F. The resulting coating exhibited excellent color, durability, humidity resistance, and other film properties. However, the second coating composition (without the phosphonium catalyst) did not exhibit nearly the chemical resistance as the same composition with the phosphonium catalyst. This is illustrated in the test below.

Both coating compositions were sprayed over a primed metal panel coated with a solvent borne base melamine crosslinked basecoat and cured at between 250° and 265° F.

The following chemical resistance tests were then run:

| Test | First Coating with Phosphonium Catalyst | Second Coating with Amine Catalyst |
|---|---|---|
| 10% $H_2SO_4$ (24 hours, uncovered) | 10 | 10 |
| Ford #24 Organic Acid[1] (30 minutes, uncovered) | 9 | 3 |
| 5% NaOH (24 hours, uncovered) | 10 | 0 |
| where 10 = best, 0 = worst | | |

[1]Formic acid, tannic acid, honey and egg albumin mixture

EXAMPLE 2

A coating composition with the phosphonium and amine catalyst was prepared by thoroughly blending the following components:

| | Parts by Weight |
|---|---|
| Anhydride acrylic polymer (as prepared in Example 1) | 435.2 |

-continued

| | Parts by Weight |
|---|---|
| PM acetate | 38.2 |
| Butyl acetate | 118.7 |
| Methyl hexahydrophthalic anhydride | 57.5 |
| Resiflow S ® | 3.4 |
| Acetic acid | 4.0 |
| Araldite CY-184 ® | 238.1 |
| Acid polymer (as prepared in Example 1) | 174.3 |
| Butanol | 38.8 |
| Tinuvin 292 ® | 13.4 |
| Tinuvin 1130 ® | 20.1 |
| 25% Benzyl triphenylphosphoniumchloride in propanol | 66.9 |
| 20% Methyl diethanol amine in propanol | 40.2 |
| Total | 1248.8 |

This clearcoat can be used over waterborne and baked at 200° F. or over solvent borne and baked at 250°-265° F. (see Example 1 for details). This clear coat offered excellent color, durability, humidity resistance, chemical resistance, sag resistance and other film properties over both basecoats. The phosphonium catalyst gives the excellent chemical resistance and the tertiary amine gives the excellent rheology control.

We claim:

1. A coating composition comprising 20-80% by weight of reactive binder components and 80-20% by weight of an organic liquid carrier; wherein the binder consists essentially of about
    (a) 25-90% by weight, based on the weight of the binder, of an anhydride acrylic polymer having at least two reactive anhydride groups that consists of polymerized monomers of an ethylenically unsaturated anhydride or an ethylenically unsaturated dicarboxylic acid and polymerized monomers selected from the group consisting of alkyl methacrylate, alkyl acrylate and any mixtures thereof, wherein the alkyl groups have 1-8 carbon atoms and the polymer has a weight average molecular weight of about 2,000-50,000;
    (b) 5-50% by weight, based on the weight of the binder, of a glycidyl component having at least two reactive glycidyl groups; and
    (c) about 0.1-7% by weight, based on the weight of the binder, of a catalyst which is a phosphonium catalyst or a blend of phosphonium catalyst and tertiary amine which may or may not contain hydroxyl groups.

2. The coating composition of claim 1 in which the glycidyl component is selected from the group consisting of polyglycidyl ethers of low molecular weight polyols, epoxy resins of epichlorohydrin and bisphenol A, polyglycidyl esters of polyacids, polyglycidyl ethers of isocyanurates, glycidyl methacrylate or glycidyl acrylate containing acrylic methacrylate or glycidyl acrylate containing acrylic polymers or a compatible mixture of any of the above.

3. The coating composition of claim 1 in which the anhydride acrylic polymer contains about 0.1-50% by weight of monomers selected from the group consisting of styrene, acrylonitrile, methacrylonitrile and any mixtures thereof.

4. The coating composition of claim 1 in which the anhydride acrylic polymer has a glass transition temperature of 0° to 75° C. and a weight average molecular weight of about 3,000-25,000.

5. The coating composition of claim 3 in which the anhydride acrylic polymer consists essentially of 20-40% by weight, based on the weight of the acrylic polymer, of methyl methacrylate, styrene or mixture of methyl methacrylate and styrene, 35-55% by weight of an alkyl methacrylate or an alkyl acrylate having 2-4 carbon atoms in the alkyl group and 5-55% by weight of polymerizable ethylenically unsaturated anhydride or ethylenically unsaturated dicarboxylic acid.

6. The coating composition of claim 1 in which the catalyst is benzyl triphenyl phosphonium chloride.

7. The coating composition of claim 1 in which the catalyst is a phosphonium catalyst blended with bis 2-dimethylamino ethyl ether.

8. The coating composition of claim 1 in which the catalyst is a phosphonium catalyst blended with methyl diethanol amine blocked by acetic acid.

9. The coating composition of claim 5 in which the glycidyl component comprises a polyglycidyl ether of a polyol or a di- or polyglycidylester of an acid.

10. The coating composition of claim 9 in which the anhydride acrylic polymer consists of polymerized monomers of methyl methacrylate, butyl acrylate and itaconic acid.

11. The coating composition of claim 9 in which the anhydride acrylic polymer consists of polymerized monomers of methyl methacrylate butyl acrylate, styrene, maleic anhydride and maleic acid.

12. The coating composition of claim 5 in which the anhydride acrylic polymer consists essentially of polymerized monomers of methyl methacrylate, styrene, butyl acrylate and itaconic acid; and
    the glycidyl component consists essentially of sorbitol polyglycidyl ether or the di- or polyglycidylester of an acid or a mixture thereof and the catalyst is a phosphonium catalyst.

13. The coating composition of claim 5 in which the anhydride acrylic polymer consists essentially of polymerized monomers of methyl methacrylate butyl acrylate, styrene, maleic anhydride and maleic acid;
    the glycidyl component consists essentially of sorbitol polyglycidyl ether or the di- or polyglycidylester of an acid or a mixture thereof and the catalyst is a phosphonium catalyst.

14. The coating composition of claim 1 containing about 0.1-200% by weight, based on the weight of the binder, of pigment.

15. The coating composition of claim 1 in which the acrylic polymer additionally contains up to about 40% by weight of polymerized monomers selected from the group consisting of alkyl acrylate, alkyl methacrylate or mixtures thereof having 9-12 carbon atoms in the alkyl groups.

* * * * *